United States Patent
Daum et al.

(10) Patent No.: US 10,294,105 B2
(45) Date of Patent: May 21, 2019

(54) PROCESS AND APPARATUS FOR COOLING A GAS CONTAINING $SO_2$ AND/OR $SO_3$ AND WATER

(71) Applicant: OUTOTEC (FINLAND) OY, Espoo (FI)

(72) Inventors: Karl-Heinz Daum, Limburg (DE); Hannes Storch, Friedrichsdorf (DE); Ralf Neumann, Usingen (DE); Wolfram Schalk, Bad Homburg (DE)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/744,307

(22) PCT Filed: Jun. 30, 2016

(86) PCT No.: PCT/EP2016/065287
§ 371 (c)(1),
(2) Date: Jan. 12, 2018

(87) PCT Pub. No.: WO2017/016785
PCT Pub. Date: Feb. 2, 2017

(65) Prior Publication Data
US 2018/0201507 A1    Jul. 19, 2018

(30) Foreign Application Priority Data

Jul. 27, 2015    (DE) .................. 10 2015 112 220

(51) Int. Cl.
*C01B 17/60* (2006.01)
*C01B 17/80* (2006.01)
(Continued)

(52) U.S. Cl.
CPC ............ *C01B 17/806* (2013.01); *C01B 17/60* (2013.01); *F28F 27/02* (2013.01); *F28D 2020/0082* (2013.01); *F28F 2200/00* (2013.01)

(58) Field of Classification Search
CPC ....... C01B 17/806; C01B 17/60; C01B 17/80; F28F 2200/00; F28F 27/02; F28D 2021/0024; F28D 2021/0022
See application file for complete search history.

(56) References Cited

U.S. PATENT DOCUMENTS 2,947,522 A    8/1960  Keller
4,034,803 A    7/1977  Reed et al.
(Continued)

FOREIGN PATENT DOCUMENTS

| DE | 1 933 460 A1 | 1/1971 |
| DE | 2 419 096 A1 | 11/1974 |
| WO | WO 2012/136307 A1 | 10/2012 |

OTHER PUBLICATIONS

International Search Report (PCT/ISA/210) dated Sep. 28, 2016, by the European Patent Office as the International Searching Authority for International Application No. PCT/EP2016/065287.
(Continued)

*Primary Examiner* — Timothy C Vanoy
(74) *Attorney, Agent, or Firm* — Buchanan, Ingersoll & Rooney PC

(57) ABSTRACT

The above mentioned invention describes a process for cooling a gas mixture of $SO_2$ and/or $SO_3$ and water, wherein the gas mixture is cooled by means of a first heat exchanger carrying a coolant. The temperature of the coolant lies above the dew point of the gas or gas mixture.

15 Claims, 3 Drawing Sheets

(51) Int. Cl.
F28F 27/02 (2006.01)
F28D 20/00 (2006.01)

(56) References Cited

U.S. PATENT DOCUMENTS

| | | | |
|---|---|---|---|
| 4,870,816 A | 10/1989 | Nakhamkin | |
| 4,949,782 A | 8/1990 | Braud | |
| 8,926,936 B2 * | 1/2015 | Hansen | B01D 5/0039 |
| | | | 423/522 |
| 2010/0068127 A1 | 3/2010 | Schoubye | |
| 2014/0048228 A1 | 2/2014 | Hansen et al. | |

OTHER PUBLICATIONS

Written Opinion (PCT/ISA/237) dated Sep. 28, 2016, by the European Patent Office as the International Searching Authority for International Application No. PCT/EP2016/065287.

PCT International Preliminary Report on Patentability (IPRP) and Written Opinion dated Feb. 8, 2018, in corresponding International Application No. PCT/EP2016/065287 (8 pages).

* cited by examiner

PROCESS AND APPARATUS FOR COOLING A GAS CONTAINING $SO_2$ AND/OR $SO_3$ AND WATER

The present invention relates to a process and a plant for cooling a gas mixture of $SO_2$ and/or $SO_3$ and water, wherein the gas mixture is cooled by means of a first heat exchanger carrying a coolant and wherein the temperature of the coolant lies above the dew point of the gas or gas mixture.

When cooling corrosive gases or gas mixtures, the problem exists that the gas or gas mixture locally is cooled so much that the temperature falls below the dew point and as a result parts of the corrosive medium condense out and the surrounding materials start to corrode, which in the worst case leads to a leakage within the heat exchanger.

Such leakage represents a high risk for several reasons. On the one hand, the escape of the gas mixture can lead to a burden on the environment, which is extremely problematic from an ecological point of view. On the other hand, the exit of the corrosive medium also represents a considerable danger to persons occupied in the plant. Finally, so high costs are incurred that this part of the plant must be shut down and repaired.

Examples for a highly corrosive gas mixture include a mixture which contains sulfur dioxide ($SO_2$) and sulfur trioxide ($SO_3$). This gas mixture is obtained in the production of sulfuric acid. In plants for the production of sulfuric acid from metallurgical waste gases or from the combustion of elementary sulfur $SO_2$ is produced by this combustion, which subsequently is catalytically converted to $SO_3$ and further on is processed with water to obtain $H_2SO_4$. In the presence of $SO_3$, smallest amounts of moisture in the gas lead to the formation of sulfuric acid ($H_2SO_4$) and hence to the corrosion of the used metallic materials, when the temperature falls below the dew point.

In such plants, moisture therefore is withdrawn from the gases as completely as possible, in that before its catalytic conversion to $SO_3$ the $SO_2$ is treated in a drying tower by means of concentrated sulfuric acid. Typical concentrations here are 94 to 97 vol-% of sulfuric acid. The hygroscopic character of the sulfuric acid, i.e. an extremely low steam partial pressure, withdraws the moisture from the gas down to a typical residual water content of 20-30 mg $H_2O/Nm^3$.

After the catalytic conversion, $SO_3$ is contained in the gas mixture in amounts between 4 and 20 vol-%, so that there is a substantially stoichiometric excess of $SO_3$ as compared to the residual water present. The residual water content however affects the sulfuric acid dew point, i.e. the higher the water content, the higher the sulfuric acid dew point. This means that in case the gas mixture at any point within the plant impinges on a surface whose temperature lies below the dew point, sulfuric acid will condense out of the gas at this surface and thus cause corrosion.

It is also problematic that degree and quality of the gas drying in the drying tower can vary considerably in dependence on various parameters, such as acid concentration, acid temperature, uniform distribution of acid and/or gas over the cross-section of the tower, which also is reinforced by changes of process parameters with pressure or temperature. All in all, this means that the gas mixture can adopt various moisture contents and correspondingly the dew point also can rise to temperatures of 150° C.

In such cases, condensate frequently is formed and as a result a corrosion of cold parts within the sulfuric acid plant, preferably the heat exchangers, will occur. As set forth, this leads to considerable and far-reaching consequences and risks for operating personnel, plant sections and the environment.

In particular when water is used as coolant in employed heat exchangers, there also is a risk that in the case of leakages considerable amounts of water mix with the leaked $SO_3$. Thus, large amounts of sulfuric acid are obtained, which in turn leads to an even stronger corrosion and thus to a reinforcement of all negative consequences. It is particularly problematic, when due to the corrosion on metallic materials hydrogen is produced and the same even ignites.

In the past, various approaches therefore have been pursued, in order to reliably avoid a formation of condensate. The simplest technical solution is the design of the heat exchanger with a double jacket, as is known for example from DE 1 933 460. It thereby is attempted to design the guidance of coolant and gas mixture such that a leakage cannot occur even in the case of a condensation.

From U.S. Pat. No. 4,949,782 the cooling of corrosive gases in a heat exchanger is known, which contain sulfur oxides as well as sodium and vanadium salts. The gas to be heated or cooled is fed in with a temperature which lies above the corrosion-critical temperature of sodium and vanadium and thus is a function of the metallurgical quality of the materials used for the heat exchanger and of the waste gas composition.

From U.S. Pat. No. 2,947,522 it is known to divide a heat exchanger into two sections, wherein in the first section of the gas to be cooled is cooled with the cold coolant and subsequently in the second section of the gas cooled down already is cooled further with the coolant already heated in part. By this division, corrosion by condensation of acid likewise can be avoided. The possibility of separately operating both sections in counterflow at the same time reinforces the cooling capacity. A similar principle also is known from U.S. Pat. No. 4,870,816.

DE 241 99 096 finally describes a process and an apparatus for avoiding corrosion in the production of sulfuric acid, wherein the cooler itself is maintained at a temperature above the dew point of the corrosive gas with a positive external heat flow.

All these processes have in common that they only can be adjusted to stationary operating states or due to their inertia are too slow in reacting to fluctuations with regard to the dew point of the gas mixture. When a shift in the dew point occurs due to changes of operating states, in particular also during start-up and shut-down of the plant, for example due to an increase of the water content in an $SO_2/SO_3$ mixture, it cannot be ensured here that the coolant continues to be guided through the heat exchanger with a temperature which at each position of the heat exchanger lies above the current local dew point of the gas mixture. As a result, these systems remain susceptible to corrosion and for the described reasons remain a safety risk.

A measurement of the dew point of the gases directly before entry into the heat exchanger only is possible with considerable effort and therefore is not suitable for the normal process monitoring of a sulfuric acid plant.

Therefore, it is the object of the present invention to provide a process ensuring that at any time the temperature does not fall below the dew point of the corrosive gas to be cooled.

This object is solved by a process with the feature of claim 1. Such process comprises the cooling of a $SO_2/SO_3$-containing gas mixture, which contains traces of water, in a first heat exchanger carrying a coolant. The temperature of the coolant is controlled such that it lies above the dew point of the gas mixture. dew point τ given in °C. is calculated according to the following equation:

$$\tau = e^{\left(6.0006 - \left(\frac{3.158 \cdot 10^{-7}}{p \cdot 1.244 \cdot 10^{-9} \cdot c}\right)\right) + \left(0.1387 \cdot \ln(p \cdot 1.244 \cdot 10^{-9} \cdot c)\right)}$$

with $p$ = gas pressure in mbar $a$ and $c$ = water content in mg/Nm³ (after the drying tower)

By determining the water content permanently or in short intervals of at least one measurement per minute, the quality of the gas, which in turn depends on a plurality of process parameters, can be reacted to flexibly and shifts in the dew point thus can be taken into account. This offers the advantage that in the ongoing process, but also in particular states such as start-up or shut-down, the plant always is operated safely, since condensation and the related corrosion in the heat exchanger can reliably be avoided.

Preferably, the water content in the gas mixture is completed by a method based on e.g. a laser diode system.

Furthermore, it was found to be favorable to adjust the process according to the invention for systems in which the gas mixture is cooled from a temperature between 400 and 500° C. to a temperature between 130 and 180° C. This is a temperature range relevant for the cooling of $SO_2/SO_3$, in which cooling is effected to a temperature only slightly above the dew point, so that the safety measures according to the invention are particularly important.

The exothermal chemical reactions in the combustion of sulfur and/or the adiabatically performed catalytic oxidation of $SO_2$ to $SO_3$ lead to the fact that the corresponding energy heats up the gas. In one aspect of the invention, water is used as coolant. Since water is available in large quantities at low cost, its use as coolant is particularly economic.

When using water as coolant, steam and/or hot water advantageously is produced. This contributes to a better economy of the plant. Preferably, steam of 40 to 80 bar absolute is produced. At the "cold" end of the sulfuric acid plant, one or more water preheaters (=economizers) therefore are provided. For cooling the $SO_3$-containing gas upstream the intermediate or final absorption, cold boiler feed water serves as coolant which after heating flows to the steam drum. The cold boiler feed water typically will enter into the heat exchangers with 100 to 110° C. and 50 to 100 bar.

In addition, water has a relatively high specific thermal capacity. When using water, however, it is particularly necessary to employ the safety system according to the invention, as considerable amounts of sulfuric acid can be obtained by mixing with $SO_3$.

Since the heat transfer coefficient of the liquid is higher than that of the gas by one order of magnitude, the surface temperature of the heat exchanger adopts almost the same temperature as the liquid. Hence, the temperature here is in direct vicinity of the acid dew point.

A preferred embodiment of the invention provides that after the first heat exchanger a second heat exchanger is arranged. This offers the advantage that the corrosive gas mixture can be cooled down step by step. In the second heat exchanger upstream of the first heat exchanger a large part of the energy contained in the gas mixture is carried away, whereby here relatively low coolant temperatures can be employed. Due to the still high temperature of the gas mixture, however, cooling in the second heat exchanger does not involve a risk of condensation. For reaching the target temperature, the gas mixture then is cooled further in the first heat exchanger. Since the gas mixture temperature here has been lowered distinctly, there is a risk of condensation, which is why the first heat exchanger according to the invention is designed to avoid that the temperature locally falls below the dew point.

What is particularly favorable is a design in which the coolant first passes through the second and then through the first heat exchanger. The temperature of the coolant thus is raised to a temperature at which due to the control according to the invention only small corrections, preferably in the range of +/−10° C., particularly preferably +/−5° C., are necessary.

When water is used as coolant, it was found to be favorable to operate the heat exchanger such that the water evaporates at least in part. Thus, even more energy can be absorbed into the water. Usually, between 5 and 10 vol-% of the water are evaporated.

A preferred embodiment furthermore provides that the corrosive gas mixture is guided through the first and/or the second heat exchanger in counterflow to the coolant, as in this way the cooling capacity is optimized as compared to guidance in cocurrent flow.

The invention furthermore also comprises an apparatus for cooling a corrosive gas mixture which contains water as well as $SO_2$ and/or $SO_3$, wherein the apparatus includes a first coolant-carrying heat exchanger with inlet and outlet for the coolant. Furthermore, the apparatus comprises a measuring device for determining the water content in the gas mixture as well as a control device which by determining the water content determines the dew point of the gas mixture and controls the temperature of the coolant at the inlet such that it lies above the dew point of the gas mixture.

By this technical design it can be ensured that at no point of the system the corrosive gas mixture locally is cooled to a temperature below its dew point, which would result in a condensation which in turn would involve corrosion.

Preferably, a second heat exchanger is provided upstream of the first heat exchanger. As a result, a main part of the energy can first be discharged in the second heat exchanger, whereas in the first heat exchanger the required target temperature safely is achieved in a control-sensitive manner.

Particularly preferably, the second coolant-carrying heat exchanger is equipped with an outlet from which a conduit leads into the inlet of the first heat exchanger. The coolant thus can be preheated in the second heat exchanger before entry into the heat exchanger designed according to the invention. At the same time, the cooling capacity to be provided in the first heat exchanger thus decreases. The same both can be dimensioned smaller and be controlled or regulated better.

Preferably, the first and/or the second heat exchanger is fitted with cast iron fins. Cast iron involves the advantage that the surface temperature of the cast iron is higher by some degrees than in the non-finned part due to the higher heat transfer area and higher thermal conductivity. In addition, the corrosion resistance of cast iron is much higher than that in the boiler steel.

It furthermore is favorable to mount both heat exchangers in the same housing, as the plant thus can be constructed in a compact fashion.

In a preferred aspect of the invention a three-way valve furthermore is provided, from which a feed conduit extends into the inlet of the first heat exchanger. From the three-way valve a conduit furthermore extends from the outlet of the second heat exchanger and a conduit for supplying additional coolant. It thereby is possible that in the three-way valve a mixture of coolant from the second heat exchanger and additional coolant is adjusted, which is controlled such that via the conduit coolant enters into the inlet of the first heat exchanger with a temperature above the gas mixture.

The heat exchanger preferably can be designed as tube bundle heat exchanger, as here the heat-exchange surface is particularly large due to the large surface area of the tubes.

A design with a tube coil also is advantageous, however, as major amounts of coolant can be guided through the heat exchanger.

Further developments, advantages and possible applications of the invention can also be taken from the following description of the drawings and the exemplary embodiment. All features described and/or illustrated form the subject-matter of the invention per se or in any combination, independent of their inclusion in the claims or their back-reference.

Figure 3:
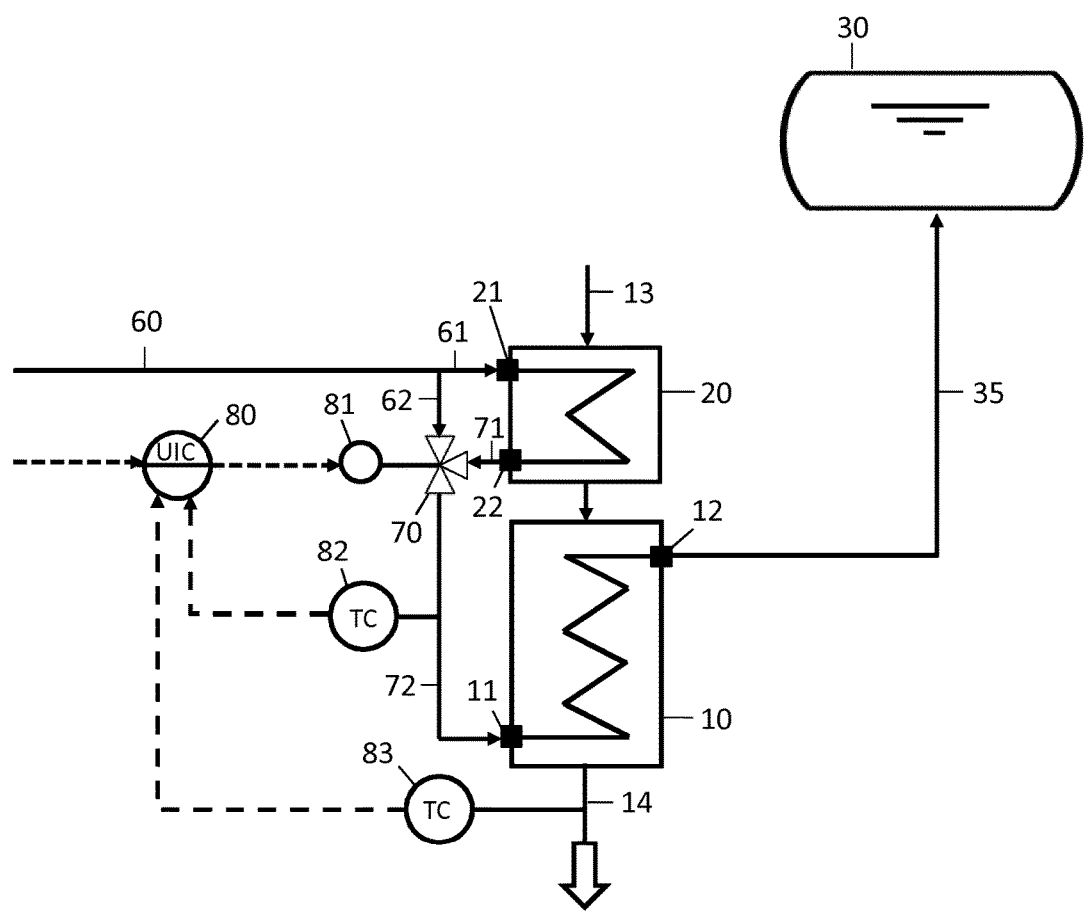
Figure 4:
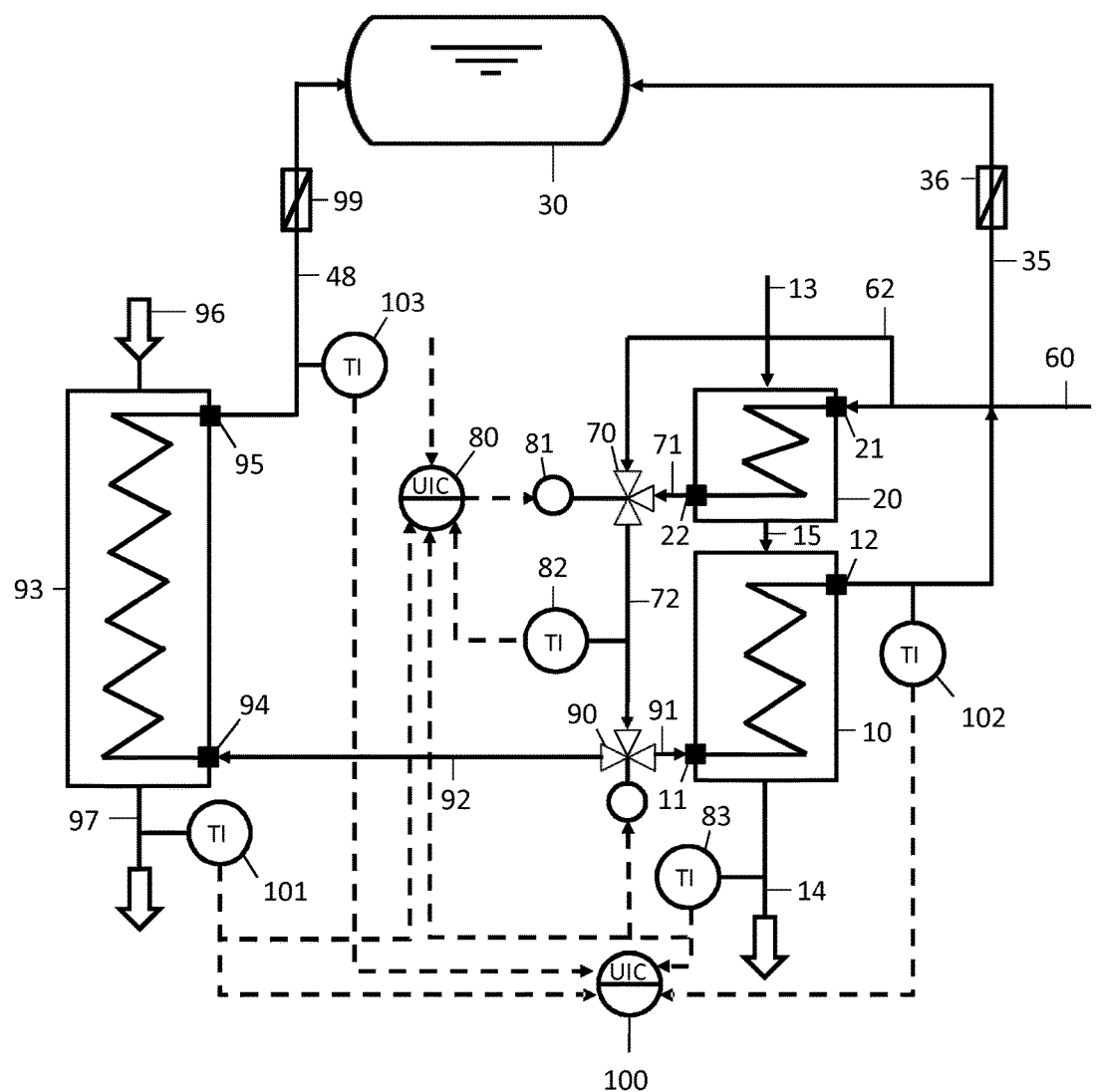

FIG. 3 schematically shows a cooling of a gas mixture containing $SO_2$ and/or $SO_3$ by means of a first and a second heat exchanger designed according to the invention FIG. 4 schematically shows a cooling of $SO_2$ and/or $SO_3$ and water with a first heat exchanger designed according to the invention and with two further heat exchangers.

Figure 1:
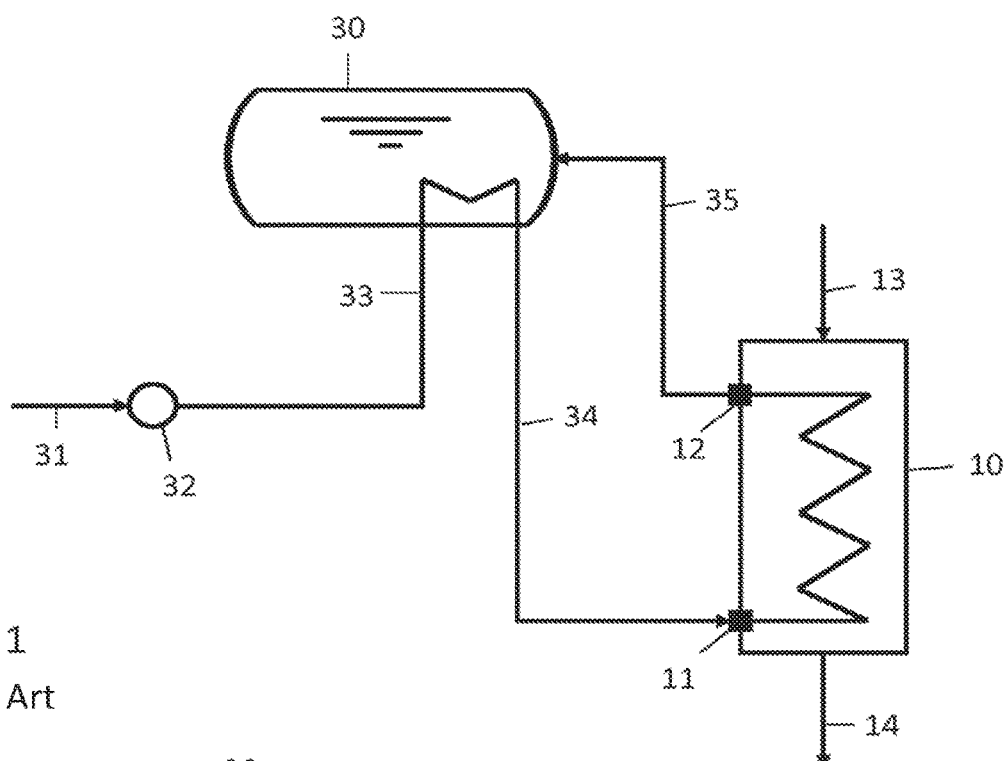
FIG. 1 shows a cooling according to the prior art

FIG. 1 schematically illustrates the typical solution of the problem underlying the invention. Via conduit 31 the temperature of the entering water is measured in a measuring device 32 before the feed water then gets into a steam drum 30. There, it is preheated to a temperature slightly above the dew point to be expected, which typically is 120 to 130° C.

Via a conduit 34, the water preheated in this way then is introduced as cooling water via an inlet 11 into a heat exchanger 10 which it then leaves again via an outlet 12. Via a conduit 35, the cooling water gets back from the outlet 12 into the steam drum 30, where the energy gained by absorption of heat is recovered and can be used at some other point of the process.

Via a conduit 13, the gas to be cooled is fed into the heat exchanger 10, before it then is withdrawn again via a conduit 14.

This system has the disadvantage that it cannot react to a shift in the dew point and therefore fails to safely avoid corrosion and the related risks.

Figure 2:
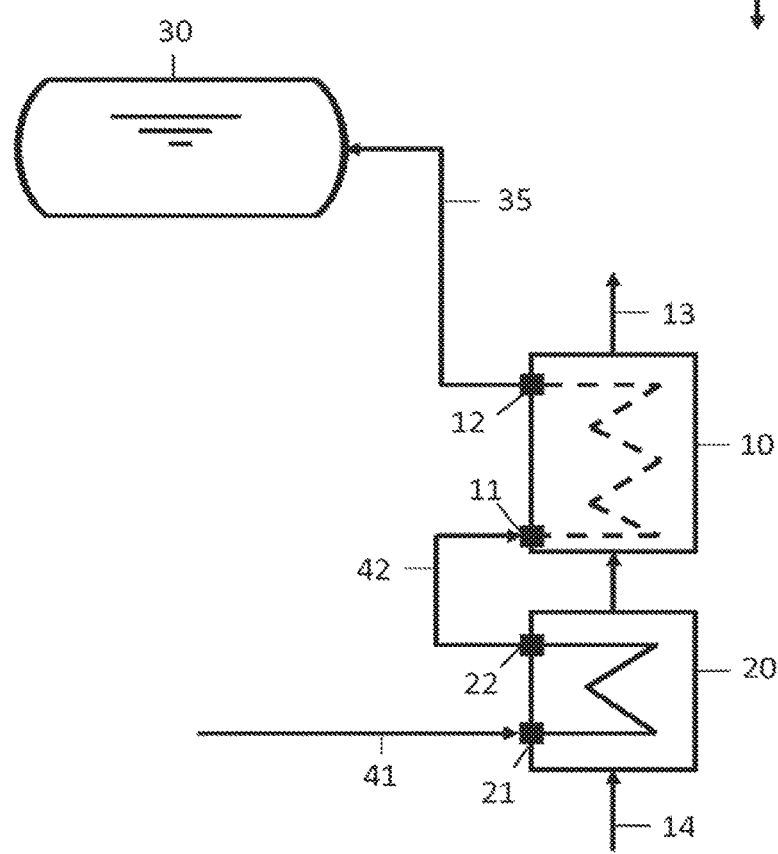
FIG. 2 shows a cooling according to the prior art

FIG. 2 shows a further formation of the prior art, in which the heat exchanger either, as shown, is split up into two individual separate modules or only the heat-exchange surface is divided. Via a conduit 41, cooling water gets into an inlet 21 of a heat exchanger 20. After the cooling water has traversed the heat exchanger 20, it exits again via an outlet 22.

Conduit 42 connects the outlet of the heat exchanger 20 with the inlet 11 of the first heat exchanger 10. The heat exchanger 10 also is traversed by the cooling water, which subsequently exits again via an outlet 12 and via a conduit 35 gets into the steam drum 30. Via conduit 13, the gas to be cooled again is fed into the heat exchanger(s) and withdrawn again via conduit 14. A conduit 15 connects the first heat exchanger 10 with the second heat exchanger 20.

FIG. 3 shows the inventive design of an apparatus for cooling a gas containing $SO_2$ and/or $SO_3$ as well as water. Via a conduit 60 and a conduit 61 the cooling water gets to the inlet 21 of a second heat exchanger 20. Via the outlet 22 the cooling water gets from the heat exchanger 20 into a conduit 71 and there into a three-way valve 70. Into this three-way valve a conduit 62 opens, which branches from the cooling water supply 60. Thus, it is possible to mix two different streams of cooling water with each other in the three-way valve, namely the cooling water originating from the first heat exchanger 10 and the cooling water originating from the second heat exchanger 20.

Control variable is the temperature of the resulting mixed stream, which is determined via the measuring device 82. The water content of the gas serves as control variable, which is determined via the measuring device 83 in the gas outlet conduit 14. In the same way, the measurement can also be effected in the inlet conduit 13. Due to the water content, the dew point of the gas can be inferred by the following equation, so that via a control device 80 the three-way valve 70 can be actuated correctly.

The gas with the temperature adjusted in this way is passed via a conduit 72 into the gas inlet 11 and thus passes the heat exchanger 10, before via the outlet 12 it gets into conduit 35 and from there into the steam boiler 30.

FIG. 4 shows two heat exchangers connected in parallel. Via conduit 60, 61 and an inlet 21, the coolant gets into a heat exchanger 20. After passing the heat exchanger 20 and exiting via the outlet 20, it gets into a three-way valve 70 via a conduit 71. In the three-way valve 70, parts of the fresh cooling water from conduit 60 also are supplied by means of conduit 62. Via conduit 72, the stream dosed in the three-way valve is supplied to a second three-way valve 90. The same splits the cooling water stream into two partial streams.

Via conduit 91 and the inlet 11 the first fraction gets into the heat exchanger 10 and again leaves the same via the outlet 12. Via conduit 35 and a separator 36 provided therein the cooling water then gets into the steam boiler 30.

Via conduit 92 and an inlet 94, the second partial stream gets into a heat exchanger 93. After passing the heat exchanger 93, the gas likewise is supplied to the steam boiler 30 via an outlet 95 as well as conduit 98 and the separator 99 provided therein.

The heat exchanger 20 and the heat exchanger 10 are charged with the gas to be cooled via the conduits 13, and 15, which subsequently is discharged via conduit 14. Via conduit 96, the heat exchanger 93 is charged with gas to be cooled, which then is withdrawn via a conduit 97.

Control variable for the first three-way valve 70 is the temperature of the stream 72, which is checked via a temperature meter 82. The temperature is dependent on the water content of the gas to be cooled, which in general is determined by a device 83. In the control unit 80 of the dew point system, the temperature of the cooling water in conduit 72 hence can be determined from this control variable as temperature above the dew point temperature.

The division in the second control valve 90 is effected such that the outlet temperatures of the cooling water both in conduit 35 and in conduit 98 still are above the dew point, wherein the control valve 90 actuated by the control device 100 still is important, as the acid dew point in the flowing gas also is determined in the heat exchanger 93.

Preferably, the division in the control valve 90 is made such that the outlet temperatures measured in the measuring devices 102 and 103 are equal. It hence is ensured that both heat exchangers in the heat offerings correspondingly are supplied with cooling water.

In some cases, the combined heat offerings go beyond what is required for heating the cooling water up to the boiling temperature. In the heat exchanger, a pre-evaporation takes place up to a certain extent. This can be up to 5 to 10% of the introduced water. Thus, steam mixtures exit from the heat exchangers, which have identical temperatures and therefore no longer are suitable for the aforementioned distribution of the preheated water to the two heat exchangers on the basis of these temperatures. If this is the case, the distribution of the preheated cooling water can be controlled by means of the two gas outlet temperatures, which are determined via the measuring device 101 and 14.

In principle, the concept also can be applied to more than two heat exchangers operated in parallel on the water side.

LIST OF REFERENCE NUMERALS

10 first heat exchanger
11 inlet
12 outlet
13 gas inlet
14 gas outlet
15 gas conduit
20 second heat exchanger
21 inlet
22 outlet
30 steam boiler
31 measuring device
33-35 conduit
36 separating device
41, 42 conduit
60-62 conduit
70 three-way valve
71, 72 conduit
80 control device
81 signal generator
82 temperature measuring device
83 temperature measuring device
90 three-way valve
91, 92 conduit
93 heat exchanger
94 inlet
95 outlet
96 gas inlet
97 gas outlet
98 conduit
99 separator
100 control device
101-103 temperature measuring device

The invention claimed is:

1. A process for cooling a gas mixture of $SO_2$ and/or $SO_3$ and water comprising cooling the gas mixture with a first heat exchanger carrying a coolant, wherein the temperature of the coolant lies above the dew point of the gas or gas mixture, the coolant is water, and the dew point $\tau$ given in $°$ C. is calculated according to the following equation:

$$\tau = e^{\left(6.0006 - \left(\frac{3.158 \cdot 10^{-7}}{p \cdot 1.244 \cdot 10^{-9} \cdot c}\right)\right) + \left(0.1387 \cdot \ln\left(p \cdot 1.244 \cdot 10^{-9} \cdot c\right)\right)}$$

with $p$ = gas pressure in mbar $a$ and $c$ = water content in mg/$Nm^3$.

2. The process according to claim 1, wherein the water content is determined by a method based on a laser diode system.

3. The process according to claim 1, wherein the gas mixture is cooled from a temperature between 400 and 500° C. to a temperature between 130 and 180° C.

4. The process according to claim 1, wherein the coolant is heated so that the coolant at least partly evaporates.

5. The process according to claim 1, wherein the gas mixture is guided through the first heat exchanger counterflow to the coolant.

6. The process according to claim 1, wherein a second heat exchanger is provided before the first heat exchanger and that the coolant is guided first through the second heat exchanger and then through the first heat exchanger.

7. An apparatus for cooling a gas mixture of $SO_2$ and/or $SO_3$ and water comprising a first coolant-carrying heat exchanger with an inlet and an outlet for the coolant, a control or regulating device which adjusts the temperature of the coolant at the inlet to a temperature above the dew point of the gas or gas mixture, and a measuring device for determining the water content of the gas mixture, which is coupled with the control or regulating device such that the dew point $\tau$ given in $°$ C. is calculated according to the following equation:

$$\tau = e^{\left(6.0006 - \left(\frac{3.158 \cdot 10^{-7}}{p \cdot 1.244 \cdot 10^{-9} \cdot c}\right)\right) + \left(0.1387 \cdot \ln\left(p \cdot 1.244 \cdot 10^{-9} \cdot c\right)\right)}$$

with $p$ = gas pressure in mbar $a$ and $c$ = water content in mg/$Nm^3$.

8. The apparatus according to claim 7, further comprising a second coolant-carrying heat exchanger with an inlet and an outlet, wherein a conduit connects the outlet of the second heat exchanger with the inlet of the first heat exchanger.

9. The apparatus according to claim 8, wherein the first and/or the second heat exchanger includes cast ribs in its interior, by which the coolant is guided from the inlet to the outlet.

10. The apparatus according to claim 9, wherein the first and the second heat exchanger are mounted in the same housing.

11. The apparatus according to claim 10, wherein a three-way valve is provided, from which a feed conduit extends into the inlet of the first heat exchanger and into which extends a conduit from the outlet of the second heat exchanger and a conduit for supplying additional coolant, wherein the three-way valve is designed such that it adjusts the mixture of coolant from the second heat exchanger and additional coolant such that via the conduit coolant enters into the inlet of the first heat exchanger with a temperature above the gas or gas mixture.

12. The apparatus according to claim 9, wherein a three-way valve is provided, from which a feed conduit extends into the inlet of the first heat exchanger and into which extends a conduit from the outlet of the second heat exchanger and a conduit for supplying additional coolant, wherein the three-way valve is designed such that it adjusts the mixture of coolant from the second heat exchanger and additional coolant such that via the conduit coolant enters into the inlet of the first heat exchanger with a temperature above the gas or gas mixture.

13. The apparatus according to claim 8, wherein the first and the second heat exchanger are mounted in the same housing.

14. The apparatus according to claim 13, wherein a three-way valve is provided, from which a feed conduit extends into the inlet of the first heat exchanger and into which extends a conduit from the outlet of the second heat exchanger and a conduit for supplying additional coolant, wherein the three-way valve is designed such that it adjusts the mixture of coolant from the second heat exchanger and additional coolant such that via the conduit coolant enters into the inlet of the first heat exchanger with a temperature above the gas or gas mixture.

15. The apparatus according to claim 8, wherein a three-way valve is provided, from which a feed conduit extends into the inlet of the first heat exchanger and into which extends a conduit from the outlet of the second heat exchanger and a conduit for supplying additional coolant, wherein the three-way valve is designed such that it adjusts the mixture of coolant from the second heat exchanger and additional coolant such that via the conduit coolant enters into the inlet of the first heat exchanger with a temperature above the gas or gas mixture.

* * * * *